Feb. 14, 1933.     S. W. HARVEY     1,897,946
DISAPPEARING CANOPY TOP FOR THE RUMBLE SEATS OF AUTOMOBILES
Filed Jan. 28, 1931
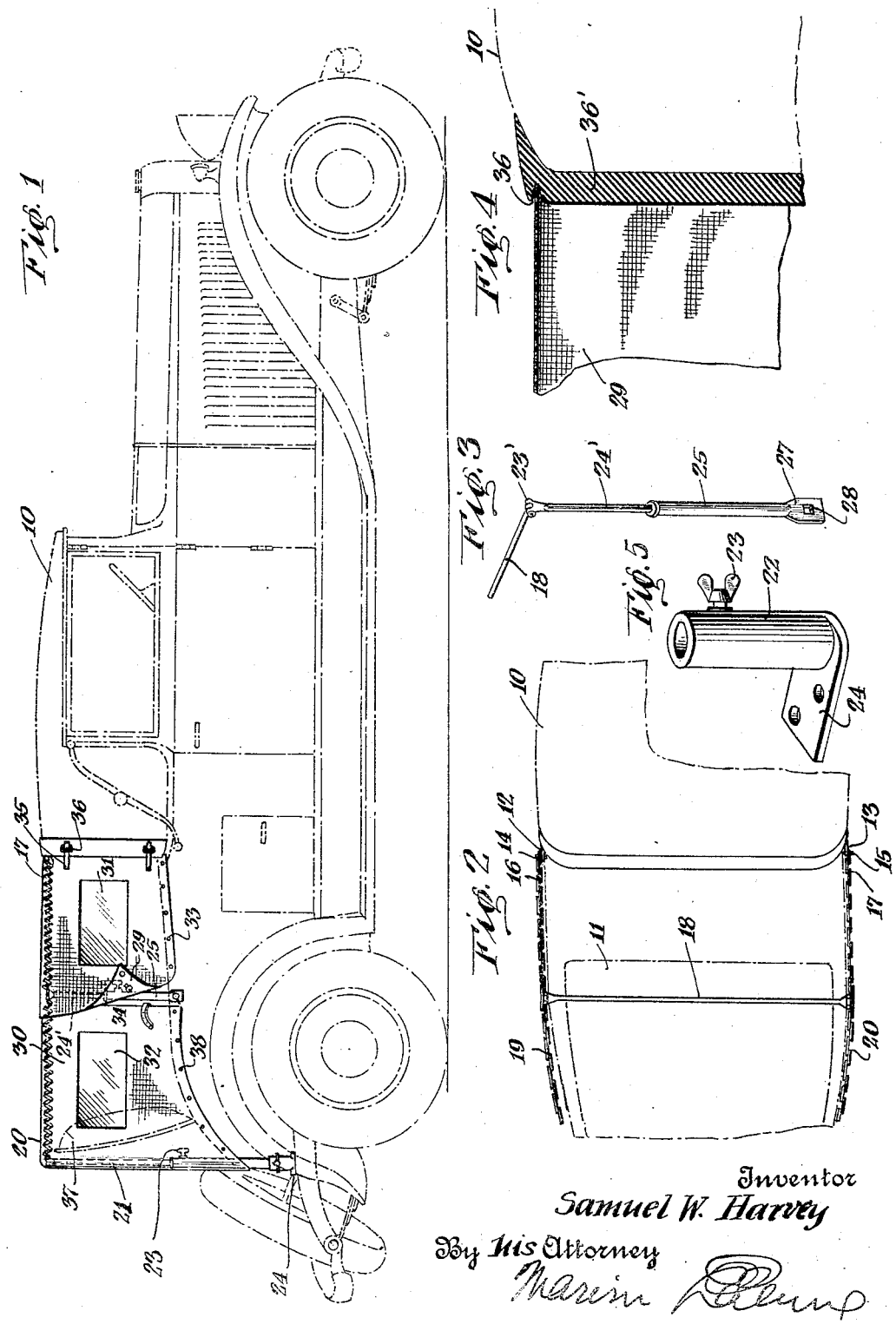
Inventor
Samuel W. Harvey
By His Attorney Patented Feb. 14, 1933

1,897,946

UNITED STATES PATENT OFFICE

SAMUEL W. HARVEY, OF NEW HAVEN, CONNECTICUT

DISAPPEARING CANOPY TOP FOR THE RUMBLE SEATS OF AUTOMOBILES

Application filed January 28, 1931. Serial No. 511,743.

This invention relates to protection devices, particularly to a canopy top for the rumble or open rear seats of an automobile, and it is the principal object of my invention to provide such a canopy which can be readily set up and collapsed.

Another object of my invention is the provision of a collapsible frame for canopy tops protecting the rumble seats of automobiles including pairwise arranged lazy-tongs securely fastened at their respective ends to support the roof formed by the removable curtains.

A further object of my invention is the provision of a pair of curtains forming the roof and sides of the canopy overlapping at their inner ends, provided with suitable fastening means for securing the curtains in place.

A still further object of my invention is the provision of a collapsible frame for the curtains composed of sets of telescoping vertical rods adapted to be secured at their lower ends to the automobile and of a comparatively simple and inexpensive construction, yet durable and highly efficient in operation.

These and other objects and advantages of my invention will become more fully known as the description thereof proceeds and will then be specifically defined in the appended claim.

In the accompanying drawing forming a material part of this disclosure:

Fig. 1 is the side elevation of an automobile shown in broken lines, equipped with a canopy top for the rumble seat constructed according to my invention.

Fig. 2 is a fragmentary inner plan view illustrating the holding devices for the top of the canopy.

Fig. 3 is a detail view of an extension post.

Fig. 4 is a fragmentary sectional detail view illustrating the engagement between the front of the canopy top with the rear wall of an automobile.

Fig. 5 is a perspective detail view of a rod socket.

As shown, an automobile 10 having a rumble seat normally covered by a cover 11 has attached to its upper rear ends eyes 12, 13, adapted to receive and hold the hooks 14, 15, at the outer ends of lazy-tongs 16, 17, the inner ends of which are attached to pins at the ends of a transverse connecting rod 18 to the other pins of which the inner ends of lazy-tongs 19, 20, are attached, the outer ends of which are secured to the ends of a transverse rod connected to the upper ends of rods 21, telescoping into lower hollow sockets 22, in which they are adjustably held by means of the set screws 23, and the sockets are secured to the bottom frame of the car by means of their feet 24. The rod 18 has its ends attached by knuckle joints 23', to rods 24' telescoping into hollow rods 25.

Rods 25 have a flattened lower end 27 perforated, as at 28, to allow the passage of securing means for attaching the rods 25 to the automobile.

The lazy-tongs 16, 17, carry a curtain 29 overlapping at its inner end a similar curtain 30 both having windows 31 and 32 formed therein.

The lower edges of the curtains 29, 30 carry snap sockets 33, adapted to be engaged by suitable buttons, on the automobile body, and the inner flaps of curtain 29 are secured to the inner flap of curtain 30 by means of strips 34.

The outer ends of curtain 29 are attached by means of the strips 35 held in suitable holders at the rear of automobile 10.

The outer ends of the curtain 29 are tucked into recesses 36 formed in a rubber strip 36' at the upper outer rear end of the automobile, to prevent water from entering the protected seat.

The back rest of the rumble seat is indicated at 37, and the lower ends of curtain 30 are secured to the automobile in a similar manner as curtain 29 by means of snap buttons 38.

The operation of my device will be entirely clear from the above description and simultaneous inspection of the drawing, and it will be evident that I have produced a quickly adjustable and removable canopy top for the rumble seat of automobiles securely held in place at the rear of the automobile body.

It will be understood that I have described and shown the preferred form of my device only and that I may use other forms which come within the scope of the appended claim without departure from my invention.

Having thus described my invention, what I claim as new and desire to secure by Letters Patent is:

In a canopy top for the rumble seats of automobiles having a collapsible frame, windowed curtains carried thereby having inner overlapping ends, means to separately connect these overlapping ends, holders at the rear of the automobile fixed top, straps on the forward end of the forward curtain engaging in said holders to hold the curtains closed at this end, a recessed rubber strip on the automobile fixed top, the upper forward end of the forward of said curtains tucked into the recess of said rubber strip to produce a tight closure between curtain and automobile.

In witness whereof I have signed my name to this specification.

SAMUEL W. HARVEY.